United States Patent [19]

Streckfus

[11] 3,985,049

[45] Oct. 12, 1976

[54] TOOL FOR CUTTING HELIX GROOVES INTO RUBBER ROLL COVERS

[76] Inventor: Frederick M. Streckfus, 4715 Hydes Road, Hydes, Md. 21082

[22] Filed: May 2, 1975

[21] Appl. No.: 573,848

[52] U.S. Cl. .................................. 82/36 R; 82/5; 142/35; 157/13
[51] Int. Cl.² ........................................ B23B 29/12
[58] Field of Search ............ 82/36 R, 5; 142/23–26, 142/35; 157/13

[56] References Cited
UNITED STATES PATENTS

| | | | |
|---|---|---|---|
| 2,000,300 | 5/1935 | Scruby | 157/13 |
| 3,196,720 | 7/1965 | Streckfus | 82/36 R |
| 3,589,427 | 6/1971 | Love | 157/13 |

Primary Examiner—Leonidas Vlachos
Attorney, Agent, or Firm—Walter G. Finch

[57] ABSTRACT

A lathe cutting tool is provided for cutting helix grooves into rubber covered rolls for use in polishing of stainless steel strip or the like. This cutting tool consists of a shaft having a cutting blade means mounted at one end thereof. A traction wheel is provided in parallel relationship with the cutting means for engaging the surface of the rubber covered roll, and means are provided for mounting the traction wheel for rotation and parallel to the cutting blade means. Bracket means are provided for mounting said shaft to a lathe for movement therealong so that the cutting tool can be used to cut helix grooves in a rubber covered roll as desired.

3 Claims, 7 Drawing Figures

TOOL FOR CUTTING HELIX GROOVES INTO RUBBER ROLL COVERS

This invention relates generally to cutting tools and more particularly it pertains to a lathe cutting tool for cutting helix grooves into rubber covered rolls for use in polishing of stainless steel strip.

It is an object of this invention to provide a small inexpensive lathe cutting tool for cutting helix grooves into rubber covered rolls for use in polishing of stainless steel strip.

Still another object of this invention is to provide a cutting tool which is easy to assemble and disassemble and which is effective and efficient in operational use for cutting helix grooves into rubber covered rolls.

And another object of this invention is to provide a lathe tool arrangement for cutting rubber covered rolls with ease and precision.

And still another object of this invention is to provide a lathe cutting tool arrangement having an easily replaceable cutter blade.

Other objects and attendant advantages of this invention will become more readily apparent and understood from the following detailed specification and accompanying drawings in which.

Figure 2:
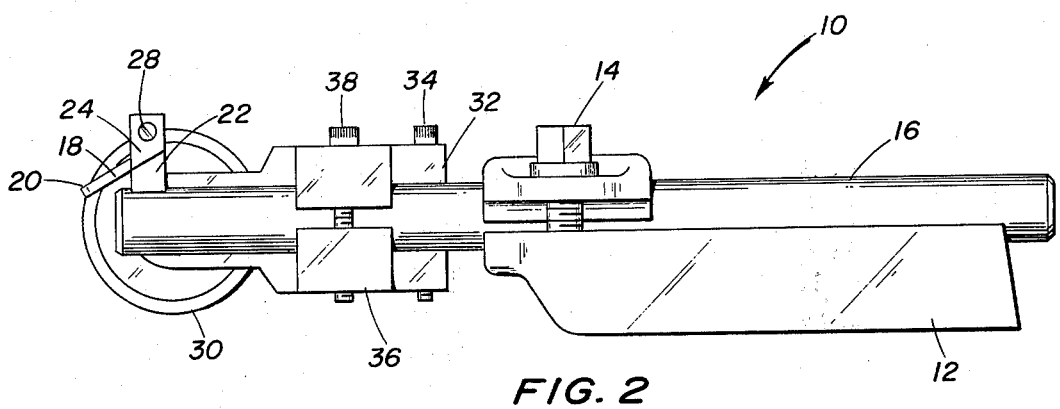
FIG. 2 is a side view of the lathe cutting tool of FIG. 1 for cutting helix grooves into a rubber covered roll.
Figure 3:
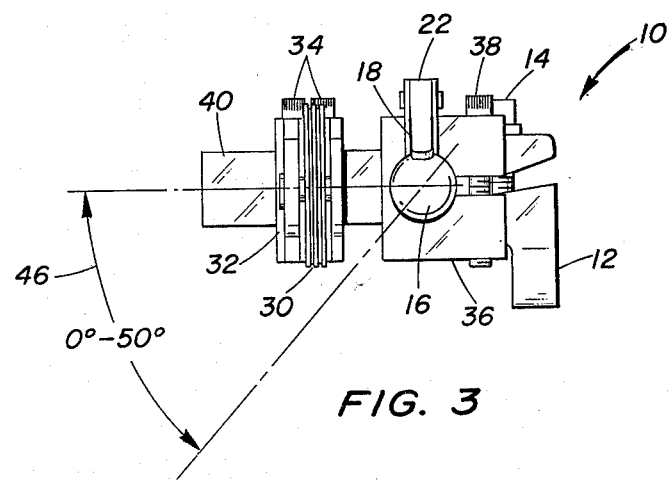
FIG. 3 is a front view of the lathe cutting tool of FIG. 1.
Figure 4:
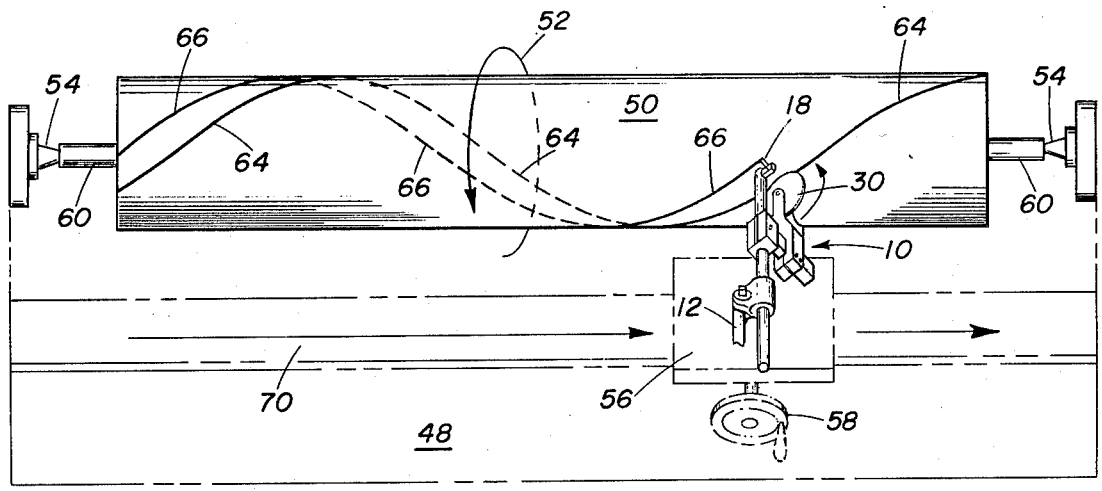
FIG. 4 is a side view of the portion of a lathe having the lathe cutting tool of FIG. 1 mounted therein for cutting helix grooves into a rubber covered roll.

Referring now to FIGS. 1, 2, 3, and 4 of the drawings, there is shown a lathe cutting tool 10 for cutting helix type grooves, such as 64 or 66 in a rubber covered roll 50, as shown in FIG. 4. This tool 10 is mounted on a lathe tool holder 56 by means of a mounting bracket 12, while the rubber covered roll 50 has its roller axles 60, at the opposite ends thereof, mounted to the spindles 54 of the lathe 48. The tool-holder 56 is arranged to move along a track 70 of the lathe 48.

Figure 7:
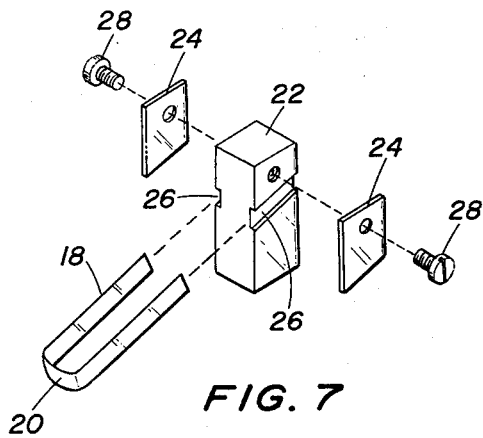
FIG. 7 is an exploded view of a cutting blade and its mounting bracket.

The lathe grooving tool 10 consists of a U-shaped groove cutting blade 18 having a sharp edge cutting blade 20 as best shown in FIG. 7. The cutting blade 18 is preferably of U-shape. A pair of spaced securing plates 24 are used for mounting the ends of the U-shaped blade 18 in slots 26 in a mounting post 22, by means of screws 28. This mounting post 22 has its lower end secured to one end of a shaft 16 of the grooving tool 10 by welding or the like.

Figure 1:
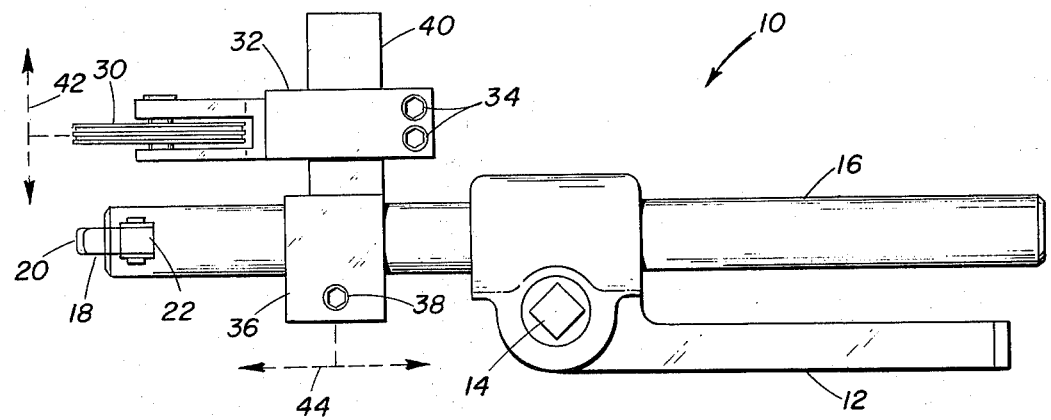
FIG. 1 is a top view of a lathe cutting tool for cutting helix grooves into a rubber covered roll incorporating features of this invention.

A clamp bracket 36 is mounted on shaft 16 intermediate its ends as shown in FIGS. 1, 2, and 3, and it is adjustable therealong by means of a screw 38. An adjustable bar 40 extends transversely from the shaft 16 and it is mounted to the bracket 36 and moves with it along shaft 16. A clamp bracket 32, in turn, is mounted to bar 40 and is adjustable therealong by means of screws 34.

This bracket 32, in turn, has mounted thereon for rotation a traction wheel 30. The adjustable bar 40 and the adjustable clamp 36 maintain the traction wheel 30 and the cutting blade 18 parallel to each other. A bracket 12, with a securing nut 14, is used to secure the shaft 16 to the lathe bracket 56, as best shown in FIG. 4.

In operation, the rubber covered roll 50 is placed in the lathe 48 by use of its axles 60 being mounted to the lathe spindles 54, as best shown in FIG. 4, and is allowed to rotate freely. The grooving tool 10 is mounted to the lathe tool holder 56 by means of the bracket 12 and it is fixed in position by the nut 14. The tool holder 56 is advanced by a handwheel 58 so as to operate in the track 70.

Figure 6:
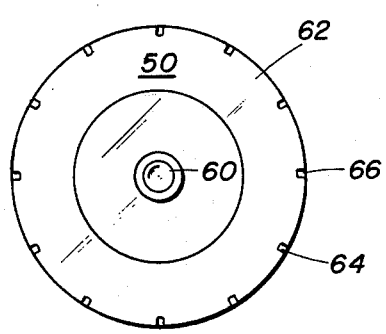
FIG. 6 is an end view of the rubber covered roll of FIG. 5.

A number of equally spaced grooves, such as 64, as desired are marked in the rubber 62 of the rubber covered roll 50 in the circumference at the end thereof, as shown in FIG. 6.

The desired angle of the helix groove 64 is accomplished by rotating both the traction wheel 30 and blade assembly 18 which is attached to the shaft 16 and secured with nut 14 on bracket 12.

The depth of the groove 64 is also adjustable by sliding the shaft 16 through the clamp in bracket 12 and securing it by means of lock nut 14.

The traction wheel 30 is adjusted to make proper contact with the rubber covered roll 50 by sliding the shaft 16 through the clamp on bracket 12 and securing it with the nut 14.

The traction wheel 30, when it is in contact with the rubber covered roll 50, can be inclined at a selected angle up to 50 degrees as shown in FIG. 3, and it will cause the rubber covered roll 50 to rotate as the handwheel 58 is turned, moving the tool 10 along the track 70.

Since the cutting blade 18 is parallel with the traction wheel 30, it will follow and cut the first helix groove 64. The grooving tool 10 is then returned to its starting position. The traction wheel 30 is then adjusted to track in the first groove 64 by means of the clamp bracket 32 and it is secured by nuts 34, as the second helix groove is cut in the rubber covered roll 50.

Figure 5:
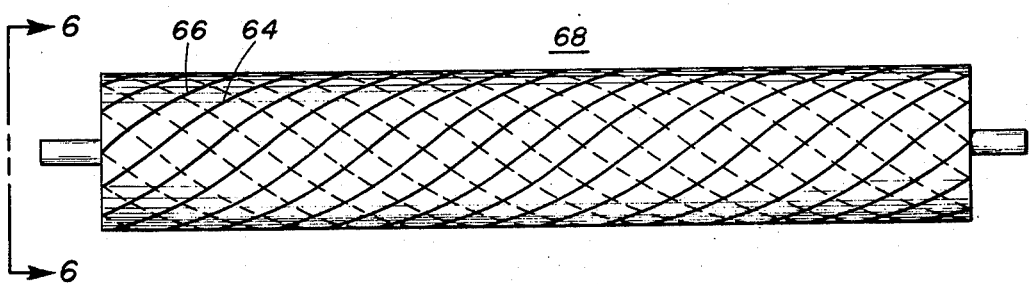
FIG. 5 is a side view of a rubber covered roll which has helix grooves cut therein.

The rest of the helix grooves are then cut in the same manner as best shown in FIG. 5 to obtain the completed roll 68.

Obviously many modifications and variations of the present invention are possible in light of the above teachings. It is, therefore, to be understood that within the scope of the appended claims the invention may be practiced otherwise than as specifically described.

What is claimed is:

1. A lathe cutting tool mountable on a lathe assembly for cutting helix grooves into a rubber covered roll, comprising:
    a shaft;
    cutting blade means;
    means for mounting the cutting blade means on one end of the shaft;
    first bracket means slidably mounted on the shaft, the first bracket means having a bar extending therefrom perpendicular to the longitudinal axis of the shaft;
    second bracket means slidably mounted on the bar;
    a traction wheel;
    means for mounting the traction wheel for rotation on the second bracket means, the traction wheel lying in a plane parallel to the longitudinal axis of the cutting blade means; and mounting means for slidably mounting the shaft to the lathe assembly, the shaft being rotatable about its longitudinal axis within the mounting means to adjust the angle of the traction wheel and cutting blade means relative to the roll so as to vary the angle of the helix grooves being cut.

2. The lathe cutting tool of claim 1 wherein the cutting blade means comprise a U-shaped blade and wherein the cutting blade means comprise:

post means attached to one end of the shaft and extending perpendicularly therefrom, the post means having slots in side faces thereof parallel to the longitudinal axis of the shaft, the slots extending in the same direction at a given angle relative to the longitudinal axis of the shaft, parallel arm portions of the U-shaped blade respectively fitting into one each of the slots; and, spaced securing plates attached one each to the side faces of the post means to hold the U-shaped blade of the post means.

3. The lathe cutting tool of claim 1 and further comprising means for securing the first and second bracket means to the shaft and to the bar respectively.

* * * * *